(12) United States Patent
Hoffner et al.

(10) Patent No.: US 11,350,306 B2
(45) Date of Patent: May 31, 2022

(54) DYNAMICALLY PRIORITIZING USERS DURING NETWORK CONGESTION

(71) Applicant: Verizon Patent and Licensing Inc., Arlington, VA (US)

(72) Inventors: Barry F. Hoffner, Bridgewater, NJ (US); Ratul K. Guha, Warwick, PA (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 176 days.

(21) Appl. No.: 16/601,725

(22) Filed: Oct. 15, 2019

(65) Prior Publication Data
US 2021/0112436 A1   Apr. 15, 2021

(51) Int. Cl.
*H04W 28/02* (2009.01)
*H04L 41/5022* (2022.01)
*H04L 47/11* (2022.01)
*H04L 41/5025* (2022.01)
*H04L 41/5003* (2022.01)

(52) U.S. Cl.
CPC ..... *H04W 28/0268* (2013.01); *H04L 41/5003* (2013.01); *H04L 41/5022* (2013.01); *H04L 41/5025* (2013.01); *H04L 47/11* (2013.01); *H04W 28/0284* (2013.01)

(58) Field of Classification Search
None
See application file for complete search history.

(56) References Cited

U.S. PATENT DOCUMENTS

| | | | | |
|---|---|---|---|---|
| 6,157,613 A | * | 12/2000 | Watanabe | H04L 12/5602 370/230.1 |
| 10,218,589 B1 | * | 2/2019 | Matthews | H04L 43/0817 |
| 2008/0081637 A1 | * | 4/2008 | Ishii | H04W 28/10 455/453 |
| 2008/0232266 A1 | * | 9/2008 | Jitsui | H04L 47/11 370/252 |
| 2010/0279653 A1 | * | 11/2010 | Poltorak | H04M 15/80 455/410 |
| 2011/0312313 A1 | * | 12/2011 | Hiraga | H04W 28/0268 455/418 |
| 2012/0163203 A1 | * | 6/2012 | Wilkinson | H04L 65/4092 370/252 |
| 2013/0223222 A1 | * | 8/2013 | Kotecha | H04L 43/16 370/235 |
| 2013/0272197 A1 | * | 10/2013 | Avila Gonzalez | H04W 24/02 370/328 |
| 2013/0329559 A1 | * | 12/2013 | Cabrera | H04L 47/245 370/235 |

(Continued)

*Primary Examiner* — Andre Tacdiran

(57) ABSTRACT

A system may receive an indication that a user device is connecting to a network and determine, based on a profile associated with the user device, that a priority associated with the user device is to be modified when congestion associated with the network reaches a level. The system may send, to a base station, a first request to monitor the congestion associated with the network. The system may receive, from the base station, an indication that the congestion associated with the network has reached the level. The system may send, to the base station, a second request to modify the priority associated with the user device when the congestion associated with the network is at the level.

20 Claims, 6 Drawing Sheets

(56) References Cited

U.S. PATENT DOCUMENTS

| | | | |
|---|---|---|---|
| 2015/0195746 A1* | 7/2015 | Franklin | H04N 21/238 |
| | | | 370/230 |
| 2015/0382230 A1* | 12/2015 | Miklos | H04W 28/0205 |
| | | | 370/230 |
| 2016/0205570 A1* | 7/2016 | Bedekar | H04W 24/02 |
| | | | 370/252 |
| 2017/0201461 A1* | 7/2017 | Cheng | H04L 43/16 |
| 2018/0027567 A1* | 1/2018 | Saghir | H04W 4/08 |
| | | | 370/230 |
| 2018/0329792 A1* | 11/2018 | Chkodrov | G06F 11/0736 |
| 2020/0068446 A1* | 2/2020 | Nimbavikar | H04W 24/08 |
| 2020/0267088 A1* | 8/2020 | Navratil | H04L 47/32 |
| 2020/0336945 A1* | 10/2020 | Gapin | H04W 72/1236 |
| 2021/0153070 A1* | 5/2021 | Velev | H04W 76/12 |
| 2021/0274387 A1* | 9/2021 | Kousaridas | H04L 41/5035 |

* cited by examiner

DYNAMICALLY PRIORITIZING USERS DURING NETWORK CONGESTION

BACKGROUND INFORMATION

Mobile video streaming traffic has grown at a high rate, with unpredictable peaks in usage. Even a small number of users streaming videos can easily overwhelm a cell, leading to congestion for users. Radio access network (RAN) congestion can affect the quality of experience (QoE) for users. In an over congested RAN, users may experience a degradation in the quality of service, which may impact the users' ability to access data services on their devices. In addition, when a radio network is congested, public safety users may not be able to use data services when emergency conditions occur.

DETAILED DESCRIPTION OF PREFERRED EMBODIMENTS

The following detailed description refers to the accompanying drawings. The same reference numbers in different drawings identify the same or similar elements.

A policy applied to a network may be independent of how much congestion the network may be experiencing. For example, a policy that is applied to a policy server in a core network may not take into account the congestion experienced by the RAN. As a result, when network congestion occurs, users may experience a lower quality of service (QoS) and QoE. In addition, public safety users, such as emergency responders, may be unable to efficiently access the network in emergency situations.

Implementations described herein relate to a system and method for monitoring congestion in a network and modifying the priority or quality of service (QoS) associated with users when congestion occurs. A policy server in a core network may receive an indication that one or more high priority user devices have accessed the network. The policy server may request that a base station monitor network congestion and inform the policy server when the congestion has reached a predefined level. In an embodiment, when the base station detects that the congestion has reached the predefined level, the base station may report the level of congestion to the policy server. The policy server may make a dynamic policy determination by evaluating the RAN congestion level report and subscriber profiles associated with the one or more user devices. Based on instructions from the policy server, the base station may modify a priority associated with data packets associated with the high priority user devices. In one implementation, the data packets associated with high priority user devices may be prioritized, for example, by changing a QoS Class Identifier (QCI)/Allocation and Retention Policy (ARP) value associated with the data packets, changing a QoS flow ID (QFI) and/or 5G QoS identifier (5QI) value associated with the data packets, changing the priority of the data packets, by changing a priority of a data buffer at the base station, and/or by performing a different action.

Figure 1:
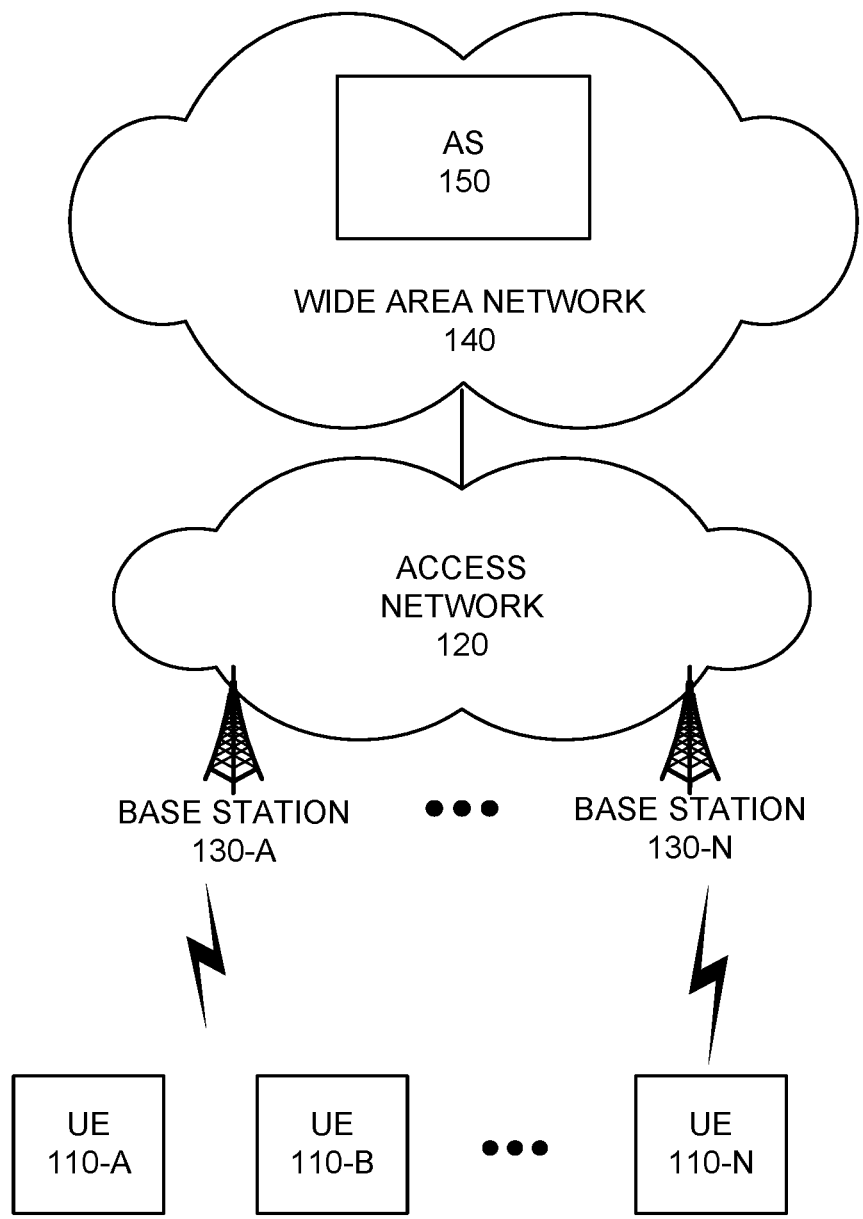
FIG. 1 is a diagram illustrating an exemplary network environment consistent with an embodiment.

FIG. 1 is a diagram illustrating an exemplary network environment 100 consistent with an embodiment. As shown in FIG. 1, environment 100 may include endpoint user equipment devices (UEs) 110-A to 110-N (referred to herein collectively as "UEs 110" and individually as "UE 110"), an access network 120, a wide area network (WAN) 140, and an application server (AS) 150.

UEs 110 may include any device with wireless communication functionality (e.g., cellular or mobile wireless network). For example, UEs 110 may communicate using machine-to-machine (M2M) communication, such as Machine-Type Communications (MTC). For example, UE 110 may include a utility meter (e.g., electricity meter, water meter, gas meter, etc.), an asset tracking device (e.g., a system monitoring the geographic location of a fleet of vehicles, etc.), a personal tracking device (e.g., a system monitoring the geographic location of people, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), a health monitoring device (e.g., a blood pressure monitoring device, a blood glucose monitoring device, etc.), and/or another type of electronic device with communication capabilities.

In other implementations, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and/or a user interface.

Access network 120 may provide access to WAN 140 for UEs 110. Access network 120 may enable UEs 110 to connect to WAN 140 for Internet Protocol (IP) services and/or non-IP data delivery (NIDD) services, mobile telephone service, Short Message Service (SMS), Multimedia Message Service (MMS), multimedia broadcast multicast service (MBMS), Internet access, cloud computing, and/or other types of data services.

Access network 120 may establish or may be incorporated into a packet data network connection between UE 110 and WAN 140 via one or more Access Points (APs). For example, access network 120 may establish a non-IP connection between UE 110 and WAN 140. Furthermore, through an AP, access network 120 may enable UE 110 to communicate with AS 150 via WAN 140.

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a Fifth Generation (5G) access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a next generation node B (gNodeB)) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an evolved NodeB (eNodeB)).

WAN 140 may include any type of wide area network, a metropolitan area network (MAN), an optical network, a video network, a satellite network, a wireless network (e.g., a CDMA network, a general packet radio service (GPRS) network, an LTE network, and/or a 5G network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Subsystem (IMS) network (not shown in FIG. 1). An IMS network may include a network for delivering IP multimedia services and may provide media flows between UE 110 and external IP networks or external circuit-switched networks (not shown in FIG. 1).

AS 150 may include one or more devices, such as computer devices, databases, and/or server devices, that facilitate non-IP data delivery services. Such services may include supporting Internet of Things (IoT) applications such as alarms, sensors, medical devices, metering devices, smart home devices, wearable devices, retail devices, etc. Other services may be also be supported by AS 150, such as communications applications (e.g., short message service (SMS), etc.), automotive applications, aviation applications, etc. AS 150 may communicate with UEs 110 over access network 120 using IP and/or non-IP bearer channels. While only one AS 150 is shown in FIG. 1, in various embodiments, multiple application servers may be associated with different entities and used within environment 100. Application servers 150 may be supported by service providers associated with various organizations (e.g., companies, non-profits, collaborative enterprises, etc.).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
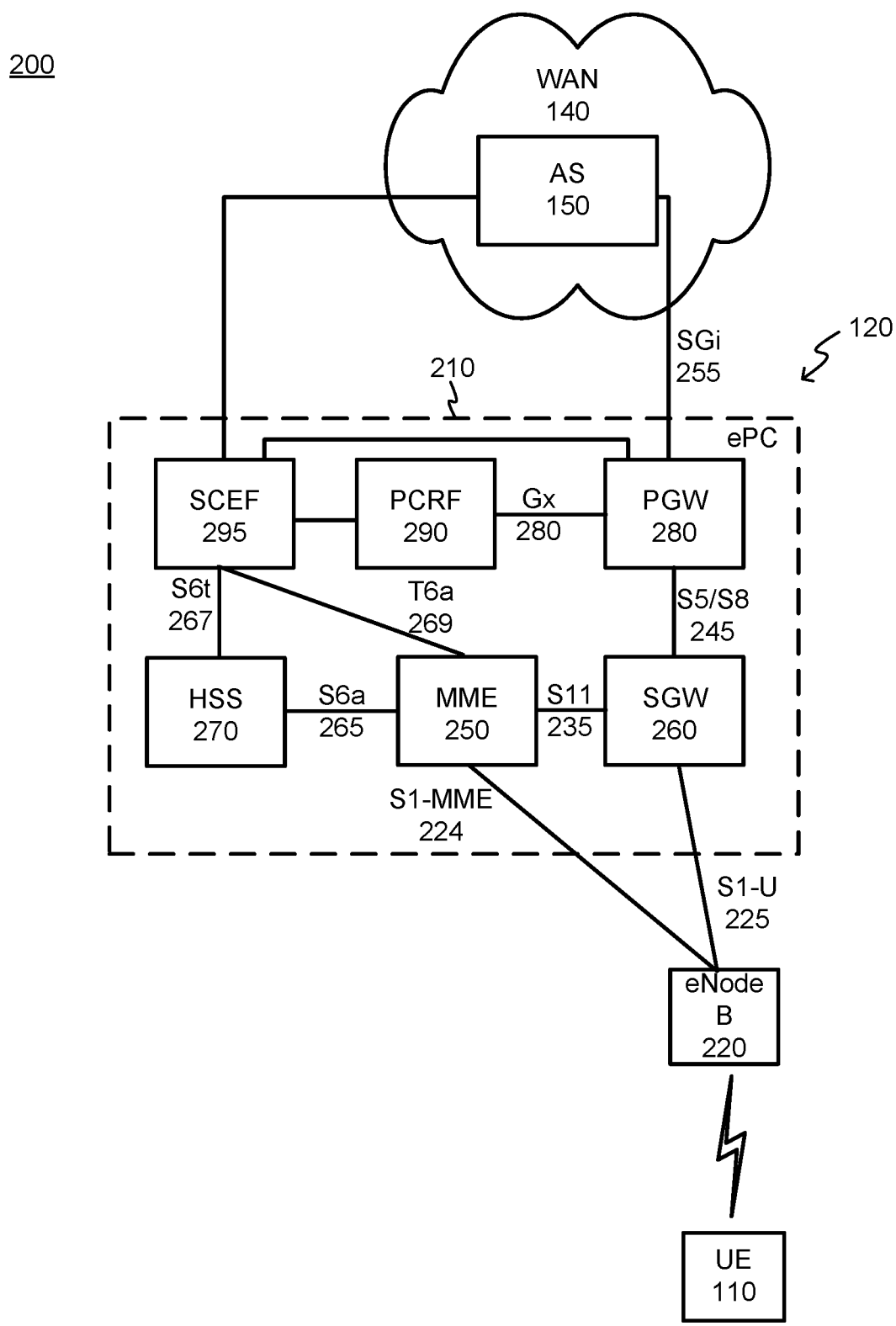
FIG. 2 is a block diagram of an exemplary system having an access network based on an LTE standard.

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). UE 110 and eNodeB 220 may exchange data over a radio access technology (RAT) based on LTE air channel interface protocols. In the embodiment shown in FIG. 2, ePC 210 may operate in conjunction with an evolved Universal Mobile Telecommunications System (UMTS) Terrestrial Network (eUTRAN) that includes at least one eNodeB 220. Networking system 200 may further include an Internet Protocol (IP) network and/or a non-IP network, which may be embodied separately or included in a backhaul network (not shown) and/or in WAN 140. As shown in FIG. 2, AS 150 may be connected to WAN 140 over a wired or wireless connection, using, for example, transmission control protocol/internet protocol (TCP/IP) and/or using a non-IP based protocol.

EPC 210 may include one or more devices that are physical and/or logical entities interconnected via standardized interfaces. EPC 210 may provide wireless packet-switched services and wireless packet connectivity to user devices to provide, for example, data, voice, and/or multimedia services. EPC 210 may further include a Mobility Management Entity (MME) 250, a serving gateway (SGW) 260, a home subscriber server (HSS) 270, a packet data network gateway (PGW) 280, a Policy and Charging Rules Function (PCRF) 290, and a Service Capability Exposure Function (SCEF) 295. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. eNodeB 220 may interface with ePC 210 via a S1 interface, which may be split into a control plane S1-MME interface 224 and a data plane S1-U interface 225. eNodeB 220 may interface with MME 250 via S1-MME interface 224, and interface with SGW 260 via S1-U interface 225. S1-U interface 225 may be implemented, for example, using general packet radio service (GPRS) Tunneling Protocol (GTP). S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may activate and deactivate bearers for UE 110. MME 250 may also select a particular SGW 260 for a particular UE 110. MME 250 may interface with other MMEs (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP. S5/S8 interface 245 may be used to create a session response or update bearer request. In addition, S5/S8 interface 245 may be used to introduce a new action IE named RAN_Load_Monitoring_x and to introduce a new IE to be used by eNodeB 220 to prioritize packets associated with a high priority UE 110.

PGW 280 may function as a gateway to WAN 140 through a SGi interface 255. WAN 140 may provide various services (e.g., firmware updates, over the top voice services, etc.) to UE 110. A particular UE 110, while connected to a single SGW 260, may be connected to multiple PGWs 280, one for each packet network with which UE 110 communicates.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., IEEE 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260). In addition, S11 interface 235 may be used to introduce a new action IE named RAN_Load_Monitoring_x and to introduce a new IE to be used by eNodeB 220 to prioritize packets associated with a high priority UE 110.

HSS 270 may store information associated with UE 110 and/or information associated with users of UE 110. For example, HSS 270 may store user profiles that include registration, authentication, and access authorization information. HSS 270 may additionally store information about UE 110, such as whether UE 110 is a high priority user device. MME 250 may communicate with HSS 270 through an S6a interface 265. S6a interface 265 may be implemented, for example, using a Diameter protocol.

PCRF 290 may provide policy control decision and flow based charging control functionalities. PCRF 290 may provide network control regarding service data flow detection, gating, quality of service (QoS) and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 280. Gx interface 280 may be implemented, for example, using a Diameter protocol. Gx interface 280 may be used to introduce a list of new event triggers for monitoring network congestion. In addition, Gx interface 280 may be used to introduce a new attribute-value pair (AVP) to be used by eNodeB 220 to prioritize packets for a high priority user device during network congestion.

SCEF 295 may include a network or computational device that provides exposure of 3GPP network service capabilities to third party applications. Specifically, SCEF 295 may provide network events through application programming interfaces (APIs) to external applications which may reside on AS 150 and/or UEs 110. Exposure of the various events may include, for example: UE 110 reachability; UE 110 loss of connectivity; UE 110 location reporting; UE 110 roaming status; communication failure; and change of international mobile equipment identifier-international mobile subscriber identifier (IMEI-IMSI) association. SCEF 295 may facilitate NIDD services through a non-IP packet data network (PDN) established through SCEF 295. In one implementation, SCEF 295 may exchange control plane signaling with MME 250 (via a T6a interface 269 using Diameter protocol) and/or HSS 270 (via an Sh or S6t interface 267). In one implementation, SCEF 295 may be included as part of a control plane bearer path between UE device 110 and AS 150. According to an implementation described herein, SCEF 295 may act as a gateway for connecting UE 110 to AS 150. Generally, SCEF 295 may expose APIs for multiple application servers (such as AS 150) to access network services to communicate with UEs 110. SCEF 295 may communicate with MME 250 via a modified T6a interface relative to a standardized T6a interface.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
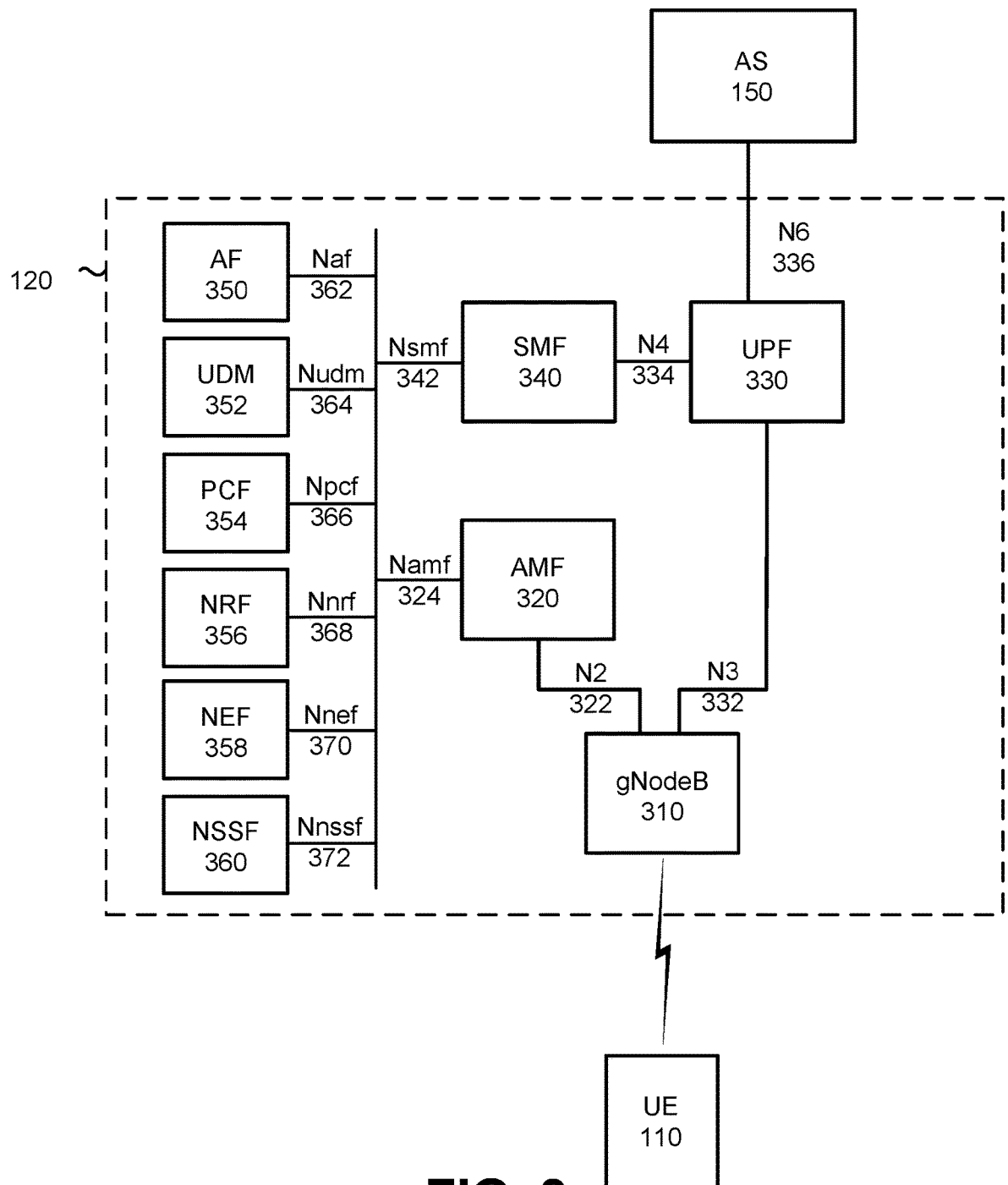
FIG. 3 is a block diagram of an exemplary system having an access network based on a 5G standard.

FIG. 3 is a block diagram of an exemplary system 300 having an access network 120 based on a 5G standard. As shown in FIG. 3, system 300 may include UE 110, access network 120, and AS 150.

Access network 120 may include a gNodeB 310 (corresponding to base station 130), an Access and Mobility Management Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable UE 110 to wirelessly connect to access network 120 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition access network 120. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to AS 150. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

Figure 4:
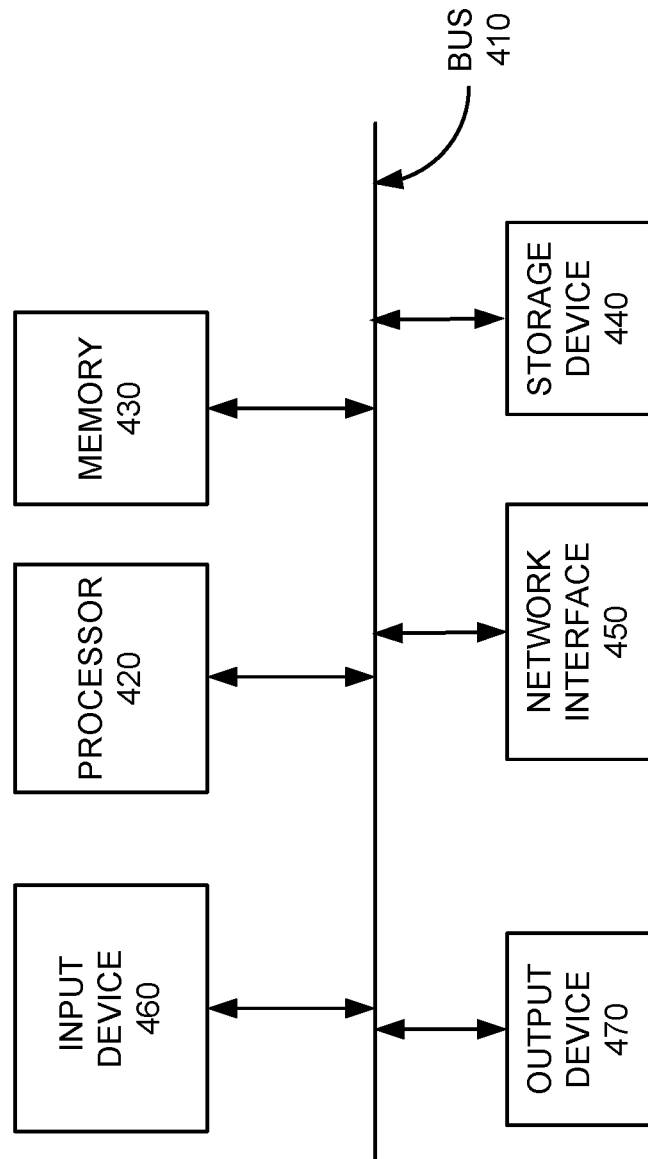
FIG. 4 is a block diagram showing exemplary components of a network device according to an embodiment.

FIG. 4 is a block diagram showing exemplary components of a network device 400 according to an embodiment. Network device 400 may include one or more network elements illustrated in FIG. 2 and/or FIG. 3, such as, for example, UE 110, AS 150, MME 250, AMF 320, HSS 270, UDM 352, SCEF 295, and/or NEF 358, etc. In some embodiments, there may be a plurality of network devices 400 providing functionality of one or more network elements. Alternatively, one network device 400 may perform the functionality of any plurality of network elements. Network device 400 may include a bus 410, a processor 420, a memory 430, storage device 440, a network interface 450, input device 460, and an output device 470.

Bus 410 provides a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 400 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 400 may perform certain operations relating to communicating from AS 150 to UEs 110. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIG. 5 and the flow chart shown in FIG. 6.

Although FIG. 4 shows exemplary components of network device 400, in other implementations, network device 400 may include fewer components, different components, additional components, or differently arranged components than depicted in FIG. 4.

Figure 5:
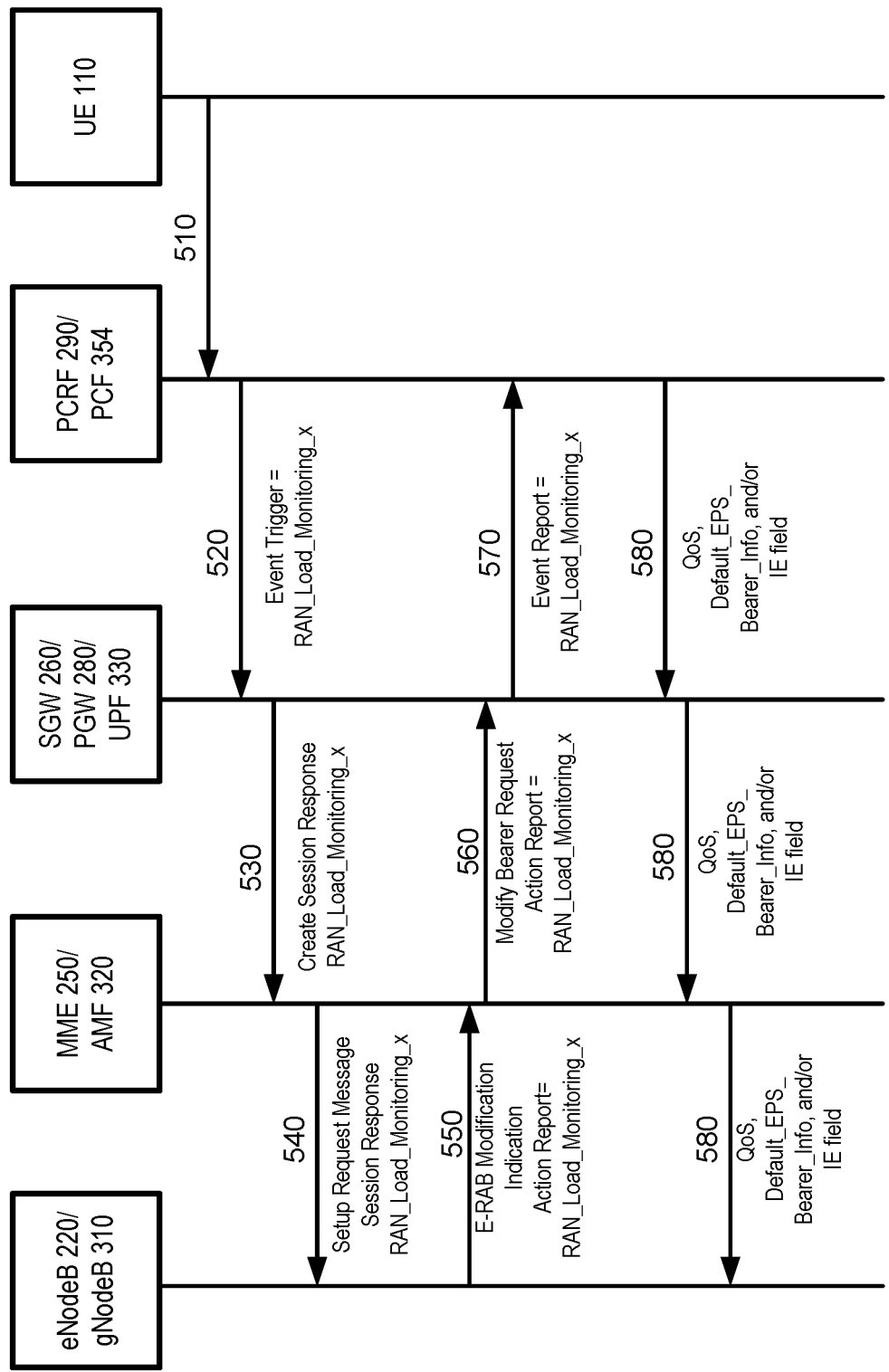
FIG. 5 is a block diagram showing exemplary message flows within a networking system for performing dynamic prioritization during congestion.

FIG. 5 is a diagram illustrating exemplary communications 500 between devices in network environment 100. Communications in FIG. 5 represent communications for performing congestion monitoring and dynamic prioritization and show network components which may correspond to both LTE and 5G network standards. The LTE components are shown with the label "2XX" and the 5G components are shown with the label "3XX." For example, as shown in FIG. 5, the base station elements are shown as "eNodeB 220/gNodeB 310," the mobility managers are shown as "MME 250/AMF 320," etc.

Referring to FIG. 5, PCRF 290/PCF 354 may receive an indication 510 that UE 110 has connected to the network and, based on a profile associated with UE 110, PCRF 290/PCF 354 may determine that UE 110 is a high priority UE 110. For example, a profile (e.g. an HSS profile stored in HSS 270 or a profile stored at another device) associated with UE 110 may include a special entitlement indicating that UE 110 is a high priority user. In one implementation, the HSS profile may indicate that UE 110 is a public safety or emergency services user. In another implementation, the profile may indicate that UE 110 has purchased a plan to receive higher priority in the case of network congestion. In response to receiving signal 510, PCRF 290/PCF 354 may transmit signal 520 to SGW 260/PGW 280/UPF 330 indicating that RAN load monitoring should be performed for one or more congestion levels associated with the RAN. As shown in FIG. 5, PCRF 290/PCF 354 may pass an event trigger "RAN_Load_Monitoring_x" to SGW 260/PGW 280/UPF 330, where x is an integer representing a congestion level to monitor for UE 110. For example, PCRF 290/PCF 354 may indicate that load monitoring should be performed for congestion levels 1, 2, and/or 3 by passing event trigger(s) RAN_Load_Monitoring_1, RAN_Load_Monitoring_2, and/or RAN_Load_Monitoring_3 to SGW 260/PGW 280/UPF 330. Additional congestion levels (i.e., level 4, level 5, etc.) may correspond to higher levels of network congestion. SGW 260/PGW 280/UPF 330 may transmit a Create Session Response signal 530 that includes RAN_Load_Monitoring_x action(s) to MME 250/AMF 320. When MME 250/AMF 320 receives signal 530, MME 250/AMF 320 may send a setup request message 540 that includes RAN_Load_Monitoring_x action(s) to eNodeB 220/gNodeB 310 to instruct eNodeB 220/gNodeB 310 to begin monitoring the congestion level of the RAN.

The congestion level of the RAN may be determined based on a number of RAN measurements. For example, eNodeB 220/gNodeB 310 may monitor several attributes of the network and may determine a congestion level of the RAN based on the measurement values. For example, eNodeB 220/gNodeB 310 may determine a congestion level based on Physical Resource Block (PRB) utilization, a number of radio resource control (RRC) connections, burst user output, radio link control (RLC) volume, a transition time interval (TTI) utilization, an average number of connected users, and/or additional attributes. Based on the measurement values, eNodeB 220/gNodeB 310 may determine that the network is not congested, may determine that the network is at the lowest level of congestion (i.e., level 1), or may determine that the network is at a higher level of congestion (e.g., level 2, level 3, etc.).

eNodeB 220/gNodeB 310 may continue to monitor the congestion level of the RAN until the congestion level reaches the level indicated by the RAN_Load_Monitoring_x action(s). When the RAN congestion level reaches the level indicated by the RAN_Load_Monitoring_x action(s), eNodeB 220/gNodeB 310 may send an Evolved-UMTS Terrestrial Radio Access Network (E-UTRAN) Radio Access Bearer (E-RAB) modification indication signal 550 to MME 250/AMF 320 that includes an indication that the network has reached the congestion level indicated by the RAN_Load_Monitoring_x action(s). For example, if eNodeB 220/gNodeB 310 receives signal 540 from MME 250/AMF 320 that includes the action RAN_Load_Monitoring_1, eNodeB 220/gNodeB 310 may continue to monitor the network congestion level until the network congestion level reaches level 1 and may then send signal 550 to MME 250/AMF 320 indicating that the congestion level has reached level 1. As another example, if eNodeB 220/gNodeB 310 receives signal 540 from MME 250/AMF 320 that includes the actions RAN_Load_Monitoring_1, RAN_Load_Monitoring_2, and RAN_Load_Monitoring_3, eNodeB 220/gNodeB 310 may continue to monitor the network congestion level until the network congestion level reaches level 2 and/or level 3 and may send a separate signal 550 to MME 250/AMF 320 when each congestion level is reached. For example, eNodeB 220/gNodeB 310 may monitor the congestion and may send a first signal 550 to MME 250/AMF 320 indicating that the congestion level has reached 1, may send a second signal 550 to MME 250/AMF 320 indicating that the congestion has reached level 2, and may send a third signal 550 to MME 250/AMF 320 indicating that the congestion has reached level 3.

MME 250/AMF 320 may send a modify bearer request signal 560 with a new action report "RAN_Load_Monitoring_x" to SGW 260/PGW 280/UPF 330 indicating the congestion level of the network. In response, SGW 260/PGW 280/UPF 330 may send an update request message 570 with a new event report "RAN_Load_Monitoring_x" to PCRF 290/PCF 354.

Based on receiving the new event report "RAN_Load_Monitoring_x," PCRF 290/PCF 354 may determine that the network is congested and may determine the level of congestion of the network. Since UE 110 is a high priority UE 110 in this example, PCRF 290/PCF 354 may change a priority level associated with UE 110. In one implementation, PCRF 290/PCF 354 may modify the priority level associated with UE 110 by, for example, assigning a new QoS and/or Default_EPS_Bearer_Information for the data session associated with UE 110. In another implementation, PCRF 290/PCF 354 may include a new IE field changing a priority associated with packets associated with UE 110.

PCRF 290/PCF 354 may forward a signal 580 with the updated QoS, Default_EPS_Bearer_Information, and/or new IE field for the data session to eNodeB 220/gNodeB 310 via SGW 260/PGW 280/UPF 330 and MME 250/AMF 320. Signal 580 may request that eNodeB 220/gNodeB 310 modify the priority associated with UE 110 and may indicate the manner in which the priority should be modified. eNodeB 220/gNodeB 310 may receive signal 580 with the updated QoS, Default_EPS_Bearer_Information, and/or new IE field and may prioritize data packets associated with UE 110. For example, eNodeB 220/gNodeB 310 may assign a higher priority to data packets associated with UE 110 by, for example, enforcing the new QoS, a new UE aggregate maximum bit rate (UE-AMBR), a new QCI/ARP value, a new QFI and/or 5QI value, a new priority for data packets, a new priority of a data buffer at eNodeB 220/gNodeB 310 for data packets associated with UE 110, etc. Assigning a higher priority to UE 110 may ensure that data packets received from or transmitted to UE 110 are provided with adequate network resources even when the network is experiencing congestion.

Figure 6:
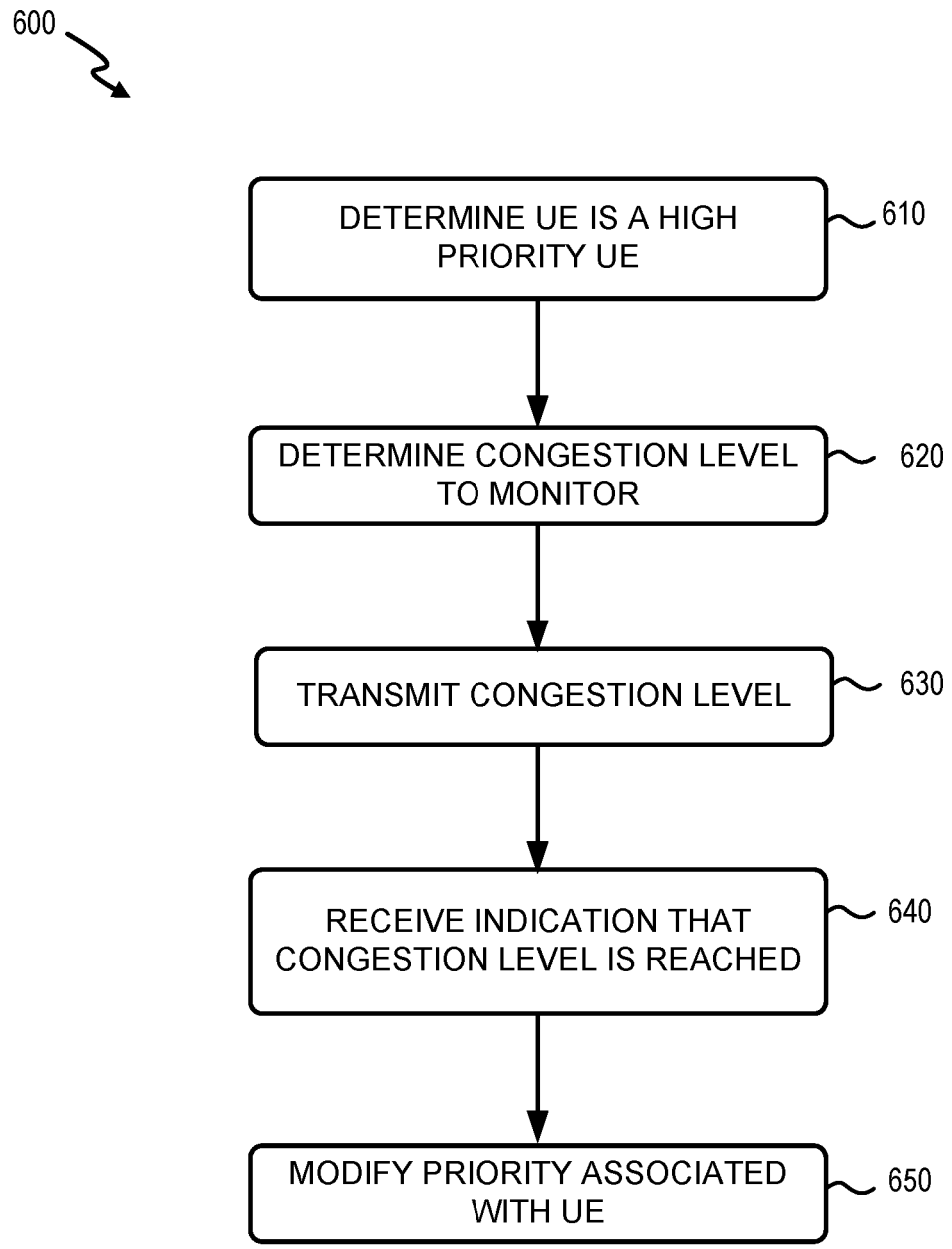
FIG. 6 is a flowchart of a process for performing dynamic prioritization during congestion.

FIG. 6 is a flow diagram illustrating an exemplary process 600 for performing congestion monitoring and priority modification. In one implementation, process 600 may be performed by PCRF 290/PCF 354.

Process 600 may begin by determining that UE 110 is accessing the network and that UE 110 is a high priority user (block 610). For example, PCRF 290/PCF 354 may determine that UE 110 is a high priority user based on information in a profile (e.g., an HSS profile or a profile stored at AMF 320) associated with UE 110. In one implementation, the profile may indicate that UE 110 is associated with a public safety or emergency services user (e.g., ambulance, fire department, police, etc., personnel). In another implementation, the profile may indicate that UE 110 is associated with a user who has purchased a "gold plan" with a higher monthly fee to ensure a higher priority during times of network congestion.

Process 600 may continue by determining a congestion level to monitor (block 620). For example, based on the information in the profile, PCRF 290/PCF 354 may determine to modify a priority associated with the data service for UE 110 at different levels. In one implementation, if UE 110 is a public safety or emergency services user, PCRF 290/PCF 354 may determine to prioritize data service at a first level for UE 110 when network congestion is at level 1 (i.e., the lowest level) and at a second level when network congestion is at level 2. In another implementation, if UE 110 is a user who has purchased a gold plan with a guaranteed QoS, PCRF 290/PCF 354 may determine to modify a priority associated with the data service for UE 110 when network congestion is at level 2.

Process 600 may continue by transmitting a signal indicating the congestion level to monitor (block 630). For example, PCRF 290/PCF 354 may send eNodeB 220/gNodeB 310 a signal indicating the level of congestion to monitor. In one example, if UE 110 is a public safety or emergency services user, PCRF 290/PCF 354 may send a signal requesting the eNodeB 220/gNodeB 310 monitor network congestion and inform PCRF 290/PCF 354 when network congestion reaches level 1 and when network congestion reaches level 2. In another example, when UE 110 is a user who has purchased a gold plan, PCRF 290/PCF 354 may send a signal requesting that eNodeB 220/gNodeB 310 monitor network congestion and inform PCRF 290/PCF 354 when network congestion reaches level 2.

Process 600 may continue by receiving an indication that network congestion has reached the specified congestion level (block 640). For example, PCRF 290/PCF 354 may receive an indication from eNodeB 220/gNodeB 310 that the network congestion level has reached the level specified by PCRF 290/PCF 354. For example, if UE 110 is a public safety or emergency services user, PCRF 290/PCF 354 may receive a first indication that the network congestion has reached level 1 and may receive a second indication that the network congestion has reached level 2. As another example, if UE 110 is a gold plan user, PCRF 290/PCF 354 may receive an indication from eNodeB 220/gNodeB 310 when the network congestion has reached level 2.

Process 600 may continue by modifying a priority associated with UE 110 (block 650). In one implementation, PCRF 290/PCF 354 may modify a QoS associated with UE 110 and may send a signal to eNodeB 220/gNodeB 310 requesting that eNodeB 220/gNodeB 310 enforce the modified QoS. For example, PCRF 290/PCF 354 may update priority parameters associated with UE 110 and request that eNodeB 220/gNodeB 310 enforce the updated priority parameters. In one example, PCRF 290/PCF 354 may update the QCI parameters associated with UE 110 and may request that eNodeB 220/gNodeB 310 enforce the updated QCI parameters. In another example, PCRF 290/PCF 354 may update the QFI and/or 5QI parameters associated with UE 110 and may request that eNodeB 220/gNodeB 310 enforce the updated QFI and/or 5QI parameters. As another example, PCRF 290/PCF 354 may set a data priority field associated with UE 110 and may request that eNodeB 220/gNodeB 310 enforce priority associated with the data priority field.

The following two examples illustrate embodiments of the process discussed in FIG. 6. The examples are for illustration purposes only and in no way limit the scope of the invention.

In the first example, user 1 may be a public safety user and the profile associated with public safety user 110 may include a special entitlement indicating that user 1 is a public safety user. In this example, when the network is congested at a level 1, the data service for user 1 may be prioritized by setting QCI to 7 and when the network is congested at level 2, the data service for user 1 may be prioritized by setting QCI to 6.

In the first example, when user 1 initiates a network session setup, PCRF 290/PCF 354 may determine that congestion levels 1 and 2 should be monitored. PCRF 290/PCF 354 may send a message to eNodeB 220/gNodeB 310 with triggers "RAN_Load_Monitoring_1" and "RAN_Load_Monitoring_2" requesting that eNodeB 220/gNodeB 310 monitor the network congestion and report when levels 1 and 2 have been reached. When congestion level 1 has been reached, eNodeB 220/gNodeB 310 may transmit a message to PCRF 290/PCF 354 with Action Report=RAN_Load_Monitoring_1. PCRF 290/PCF 354 may receive the action report and update the QCI to 7. PCRF 290/PCF 354 may further request that eNodeB 220/gNodeB 310 enforce the updated QCI.

eNodeB 220/gNodeB 310 may enforce the new QCI at level 7 for user 1 and continue to monitor the network congestion. When congestion level 2 is reached, eNodeB 220/gNodeB 310 may transmit a message to PCRF 290/PCF 354 with Action Report=RAN_Load_Monitoring_2. PCRF 290/PCF 354 may receive the action report and may update the QCI to 6. PCRF 290/PCF 354 may request that eNodeB 220/gNodeB 310 enforce the QCI at level 6. eNodeB 220/gNodeB 310 may enforce the new QCI level while the congestion remains at level 2.

In the second example, user 1 may be a public safety user, user 2 may be a user who has purchased a gold plan with a higher monthly fee and a guaranteed QoS, and user 3 may be a user with a basic plan with a lower monthly fee and no guaranteed QoS. In the profiles, special entitlements may be added to indicate that user 1 is a public safety user and user 2 is a gold plan user. In the second example, when the network is congested at level 1, the data service for user 1 may be prioritized. Additionally, when the network is congested at level 2, the data service for user 1 and user 2 may be prioritized and user 1 may have a higher priority than user 2. The data service for user 3 may not be prioritized.

In the second example, when user 1 initiates a network session setup, PCRF 290/PCF 354 may determine that congestion levels 1 and 2 should be monitored for user 1. When user 2 initiates a network session setup, PCRF 290/PCF 354 may determine that congestion level 2 should be monitored for user 2. When user 3 initiates a network session setup, PCRF 290/PCF 354 may determine that congestion levels should not be monitored for user 3.

PCRF 290/PCF 354 may send a message to eNodeB 220/gNodeB 310 with triggers "RAN_Load_Monitoring_1" and "RAN_Load_Monitoring_2" requesting that eNodeB 220/gNodeB 310 monitor the network congestion and report when levels 1 and 2 have been reached during a data session for user 1. In addition, PCRF 290/PCF 354 may send a message to eNodeB 220/gNodeB 310 with the trigger "RAN_Load_Monitoring_2" requesting that eNodeB 220/gNodeB 310 monitor the network congestion and report when level 2 has been reached during a data session for user 2.

When congestion level 1 has been reached, eNodeB 220/gNodeB 310 may send a message to PCRF 290/PCF 354 with the Action Report=RAN_Load_Monitoring_1. PCRF 290/PCF 354 may receive the action report and may set a new field, "data priority," to 2 for user 1 and request eNodeB 220/gNodeB 310 to enforce the new data priority for user 1.

eNodeB 220/gNodeB 310 may enforce the new field "data priority" and assign a higher priority to data packets associated with user 1. eNodeB 220/gNodeB 310 may further continue to monitor the network congestion. When level 2 is reached, eNodeB 220/gNodeB 310 may report to PCRF 290/PCF 354 with Action Report=RAN_Load_ Monitoring_2. PCRF 290/PCF 354 may receive the action report and may set the "data priority" field to 1 for user 1 and may request that eNodeB 220/gNodeB 310 enforce the new "data priority" field for user 1. In addition, PCRF 290/PCF 354 may set the new field "data priority" to 2 for user 2 and may request that eNodeB 220/gNodeB 310 enforce the new "data priority" field for user 2. In this way, when congestion level 2 is reached, data services for both user 1 and user 2 may be prioritized, with user 1 having a higher priority than user 2. In this example, a public safety user may be able to respond to an emergency when network congestion causes delays and dropped packets for other users.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of signal flows have been described with respect to FIG. 5, and a series of blocks have been described with respect to FIG. 6, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving a first indication that a user device has initiated setup of a network session via a network;
   determining whether the user device is associated with a priority user based on a profile associated with access by the user device of the network;
   determining, based on the profile, that a priority parameter associated with the user device is to be modified responsive to determining that congestion associated with the network session reaches an action level;
   sending, to a base station and responsive to determining that the user device is associated with the priority user, a first request to monitor the congestion associated with the network session, wherein the first request is based on the priority parameter;
   receiving, from the base station and responsive to the first request, a second indication that the congestion has reached the action level, wherein the second indication is based on respective measurement values obtained by monitoring multiple attributes of the network which relate to the congestion; and
   sending, to the base station, a second request to modify the priority parameter responsive to determining that the congestion is at or above the action level.

2. The method of claim 1, wherein the user device is associated with the priority user.

3. The method of claim 1, wherein the user device is associated with the priority user who has purchased a plan that guarantees a quality of service (QoS).

4. The method of claim 1, wherein the action level includes a plurality of discrete levels and wherein sending the first request includes:
   sending the first request with instructions to transmit a signal each time that the congestion reaches a different one of the discrete levels.

5. The method of claim 4, wherein sending the second request includes:
   sending the second request to modify the priority parameter in a first manner responsive to determining that the congestion is at or above a first discrete level of the plurality of discrete levels; and
   sending a third request to modify the priority parameter in a second manner responsive to determining that the congestion is at or above a second discrete level of the plurality of discrete levels.

6. The method of claim 1, wherein sending the second request includes sending a request to modify a QoS Class Identifier (QCI) associated with the user device.

7. The method of claim 1, wherein sending the second request includes modifying a priority field and sending the modified priority field and a request to increase data priority associated with the user device.

8. A system comprising:
a memory to store instructions; and
one or more processors configured to execute the instructions to:
receive a first indication that a user device has initiated setup of a network session via a network;
determine whether the user device is associated with a priority user based on a profile associated with access by the user device of the network;
determine, based on the profile, that a priority parameter associated with the user device is to be modified responsive to determining that congestion associated with the network session reaches an action level;
send, to a base station and responsive to determining that the user device is associated with the priority user, a first request to monitor the congestion associated with the network session, wherein the first request is based on the priority parameter;
receive, from the base station and responsive to the first request, a second indication that the congestion has reached the action level, wherein the second indication is based on respective measurement values obtained by monitoring multiple attributes of the network which relate to the congestion; and
send, to the base station, a second request to modify the priority parameter responsive to determining that the congestion is at or above the action level.

9. The system of claim 8, wherein the user device is associated with the priority user.

10. The system of claim 8, wherein the user device is associated with the priority user who has purchased a plan that guarantees a quality of service (QoS).

11. The system of claim 8, wherein the action level includes a plurality of discrete levels and wherein, when sending the first request, the one or more processors are further configured to:
send the first request with instructions to transmit a signal each time that the congestion reaches a different one of the discrete levels.

12. The system of claim 11, wherein, when sending the second request, the one or more processors are further configured to:
send the second request to modify the priority parameter in a first manner responsive to determining that the congestion is at or above a first discrete level of the plurality of discrete levels; and
send a third request to modify the priority parameter in a second manner responsive to determining that the congestion is at or above a second discrete level of the plurality of discrete levels.

13. The system of claim 8, wherein, when sending the second request, the one or more processors are further configured to send a request to modify a QoS Class Identifier (QCI) associated with the user device.

14. The system of claim 8, wherein, when sending the second request, the one or more processors are further configured to modify a priority field associated with the user device and send the modified priority field and a request to increase a data priority associated with the user device.

15. A non-transitory computer-readable medium storing instructions, the instructions comprising:
one or more instructions that, when executed by a processor, cause the processor to:
receive a first indication that a user device has initiated setup of a network session via a network;
determine whether the user device is associated with a priority user based on a profile associated with access by the user device of the network;
determine, based on the profile, that a priority parameter associated with the user device is to be modified responsive to determining that congestion associated with the network session reaches an action level;
send, to a base station and responsive to determining that the user device is associated with the priority user, a first request to monitor the congestion associated with the network session, wherein the first request is based on the priority parameter;
receive, from the base station and responsive to the first request, a second indication that the congestion associated with the network session has reached the action level, wherein the second indication is based on respective measurement values obtained by monitoring multiple attributes of the network which relate to the congestion; and
send, to the base station, a second request to modify the priority parameter responsive to determining that the congestion is at or above the action level.

16. The non-transitory computer-readable medium of claim 15, wherein the user device is associated with the priority user who has purchased a plan that guarantees a quality of service (QoS).

17. The non-transitory computer-readable medium of claim 15, wherein the action level includes a plurality of discrete levels and wherein the instructions that cause the processor to send the first request include one or more instructions that cause the processors to:
send the first request with instructions to transmit a signal each time that the congestion reaches a different one of the discrete levels.

18. The non-transitory computer-readable medium of claim 17, wherein, when sending the second request, the processor is further configured to:
send the second request with instructions to modify the priority parameter in a first manner responsive to determining that the congestion at or above a first discrete level of the plurality of discrete levels; and
send a third request with instructions to modify the priority parameter in a second manner responsive to determining that the congestion is at or above a second discrete level of the plurality of discrete levels.

19. The non-transitory computer-readable medium of claim 15, wherein the instructions that cause the processor to send the second request include one or more instructions that cause the processor to send a request to modify a QoS Class Identifier (QCI) associated with the user device.

20. The non-transitory computer-readable medium of claim 15, wherein the instructions that cause the processor to send the second request include one or more instructions that cause the processor to modify a priority field associated with the user device and send the modified priority field and a request to modify a data priority associated with the user device.

* * * * *